United States Patent [19]

Masters

[11] 4,007,781
[45] Feb. 15, 1977

[54] HEAT EXCHANGE SYSTEM

[76] Inventor: Richard M. Masters, 1 Burns Road, Lexington, Mass. 02173

[22] Filed: Nov. 15, 1974

[21] Appl. No.: 524,057

Related U.S. Application Data

[62] Division of Ser. No. 313,934, Dec. 11, 1972, Pat. No. 3,863,710.

[52] U.S. Cl. .............................. 165/46; 138/119; 138/137; 138/149
[51] Int. Cl.[2] .......................................... F28F 7/00
[58] Field of Search ................. 138/137, 149, 119; 165/46

[56] References Cited

UNITED STATES PATENTS

| | | | |
|---|---|---|---|
| 1,100,829 | 6/1914 | Joseph | 138/119 |
| 2,097,862 | 11/1937 | McKay | 138/137 |
| 2,112,737 | 3/1938 | Dodge | 138/137 |
| 2,652,093 | 9/1953 | Burton | 138/137 |
| 3,384,089 | 5/1968 | Shriner | 138/137 |
| 3,425,455 | 2/1969 | Kilpert | 138/149 |
| 3,665,968 | 5/1972 | De Putter | 138/149 |

*Primary Examiner*—Charles J. Myhre
*Assistant Examiner*—Daniel J. O'Connor
*Attorney, Agent, or Firm*—Robert F. O'Connell

[57] ABSTRACT

A heat exchange system for heating a plurality of separate locations or for dissipating heat from a heat source at a region remote therefrom. A plurality of heat exchange devices in the form of flexible containers or envelopes, are mounted in heat exchange, or thermal, relationship with a conveying means which conveys a heated fluid material from a heat source. The containers are mounted so as to be maintained in a substantially extended relationship with the conveying means so that the heat from the heated fluid is effectively transferred via the heat exchange device to the regions adjacent thereto, substantially primarily by convection.

4 Claims, 19 Drawing Figures

HEAT EXCHANGE SYSTEM

This is a division of application Ser. No. 313,934, now U.S. Pat. No. 3,863,710, filed on Dec. 11, 1972.

DISCLOSURE OF THE INVENTION

This invention relates generally to heat exchange systems and, more particularly, to a system which uses a plurality of spatially mounted flexible heat exchange devices adapted to transfer heat primarily by convection from a heated fluid to the atmosphere in which they are mounted.

BACKGROUND OF THE INVENTION

There are many applications in which it is desirable to utilize a simple, inexpensive heat exchange system, either for heating a plurality of separately located regions or for dissipating heat at a region remote from a heat-generating source. For example, it may be required to heat a plurality of elements, in some cases a relatively large number thereof, spread out over a relatively large area, such heating being required for unpredictable durations of times. Such elements, for example, may be trees or other plants which are placed within an orchard, such trees being subject to frost damage thereto when temperatures of the orchard are sufficiently low for short, unpredictable intervals. In other applications, for example, one or more concrete forms which have been poured and are in the process of being cured cannot be permitted to freeze in cold weather. In still further applications it may be desirable to heat separate locations in an area such as at individual campsites of a camping area or individual vehicle locations of an outdoor drive-in theater where the heating device may be subject to damage or loss.

In situations requiring heat dissipation it may be desirable to dissipate a relatively large amount of heat, such as from an electrical generating plant. Such heat is often remotely dissipated in extremely large cooling towers which may, in some instances, be up to several hundred yards in diameter and height.

DISCUSSION OF THE PRIOR ART

In applications where heating is required in a region having separately located elements, such heating is often performed by using a plurality of independent heating units having oil or gas as the fuel. Such heating units are usually arranged to be relatively easily moved, started, stopped, fueled and stored. Such heaters may produce open or confined flames or may provide glowing hot surfaces, and often require a source of power for blowing air across the heat exchanger portion thereof to distribute the warm air for heating purposes. Usually such elements are placed at strategic positions within the region, as within an orchard, for example, where they are placed between two or more trees which are to be heated. Such systems provide a rapidly rising column of warm air with little lateral dispersion thereof until the column reaches a level well above the heater unit. In many cases the level at which appropriate dispersion takes place is also above the level of the elements which are to be heated and, accordingly, much of the heat's effectiveness is lost in the process.

Even if the air is confined in some way, such as in a large building or under temperature inversion weather conditions, the mass of air in the upper regions of the confined space must be heated before that in the lower regions thereof and, therefore, much of the heat does not effectively reach the elements to be heated, which are generally placed in the lower regions, and is thereby wasted. Moreover, the radiant heat transfer which occurs in such systems is not effective in many applications because it heats only the surface directly viewing the source thereof. Moreover, the intensity thereof decreases rapidly and is, therefore, less effective as the distance from the source increases. When a large number of elements are required to be heated the costs may become prohibitive when a relatively large number of such independent heat sources is utilized. In order to avoid undesirably high costs, such heaters have often been made as simple and inexpensive as possible, the simplification thereof usually adversely affecting the safety, reliability and durability of such units. Such cheaper heat sources often provide poor combustion, a factor which further reduces the overall efficiency of the system. Moreover, such heaters may require addditional maintenance and often produce excess smoke which can soil the elements which are being heated and, further, may not be permissible in some regions.

In those applications where a large amount of heat is to be dissipated over a relatively large region, such as in cooling towers, the prior art has utilized a complex array of metal pipes having relatively large numbers of heat dissipating metal fins effectively placed thereon. For such large cooling tower applications the expense involved in providing the required heat dissipative area in such finned structures is substantially large and in some cases may be economically prohibitive.

SUMMARY OF THE INVENTION

This invention, on the other hand, provides a relatively simple and inexpensive system for transferring heat from one source and distributing it to many independent operable heat exchange devices which can all be located effectively in one large region for maximum heat dissipation therein or can be remotely distributed at separate sites located remotely one from another to heat a plurality of independently positioned elements at the most effective location and temperature for each such element. The heat exchanger devices are in the form of flexible containers, such as plastic bags, which are relatively inexpensive to fabricate and which are capable of dissipating sufficient heat for such purpose substantially by convection. Such flexible containers can be placed at the most effective locations and in the most effective numbers for each particular application and a means for conveying a heated fluid thereto is provided. The flexible containers are appropriately mounted so that they are maintained in an extended position with respect to the heated fluid conveying means and are operatively connected to said conveying means so that heat from the heated fluid material is effectively transferred via the containers to the region in which the containers are located.

Various embodiments of the invention are described below with the assistance of the accompanying drawings wherein FIG. 1 shows in diagrammatic form a heating system in accordance with the invention;

Figure 1:
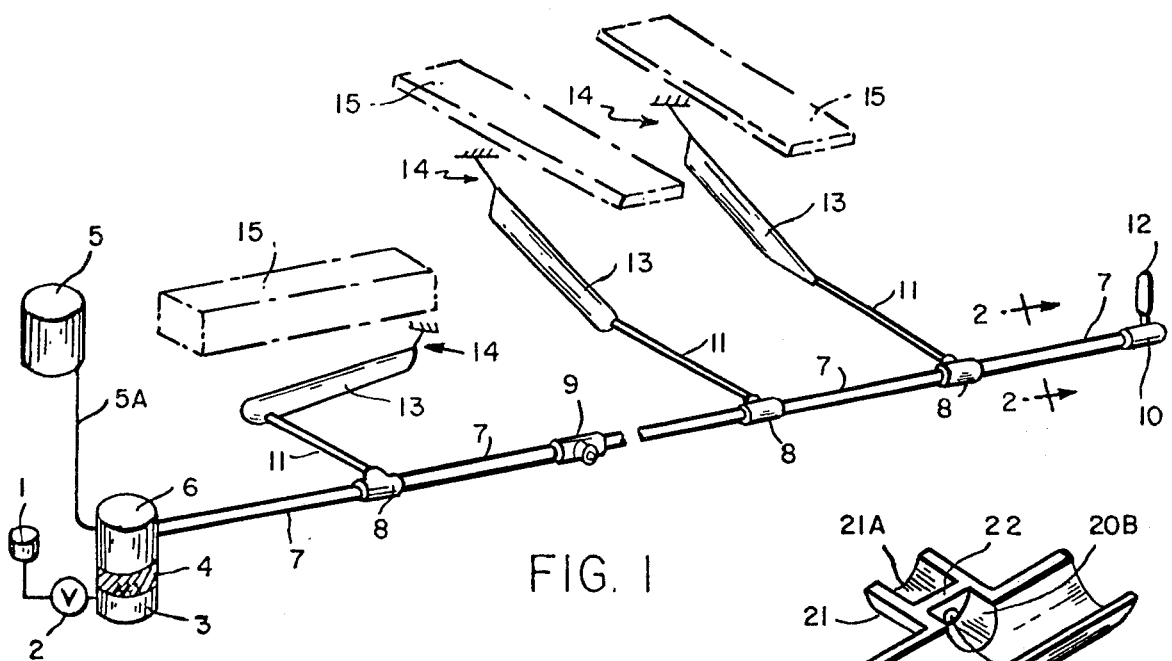

As can be seen in FIG. 1, the system of the invention can be used in an application wherein a plurality of elements 15 to be heated are remotely positioned one from another. An appropriate fuel from tank 1, as for example oil or gas, is fed to a combustion chamber 3 via an appropriate control valve 2 so as to provide a flame 4 which is utilized to heat a fluid in a boiler 6, which fluid is supplied thereto from a fluid tank 5 via pipe line 5A. The latter fluid, for example, may be water so that when such water is heated in boiler 6 water vapor is generated therein which is then conveyed through output conduit or pipe 7 past branch fittings 8. Each of the branch fittings may be utilized to supply vapor to a remote location or, as shown with respect to fitting 9, the branches can be temporarily closed with appropriate self-closing plugs placed therein. The system can be sealed at its furthest end by an appropriate cap 10 and may be further provided as needed with an air release valve 12. Each of the branches which lead to the remote locations wherein elements 15 are positioned comprises conduits or pipes 11 which are attached to fittings 8 to supply vapor to heat exchange devices 13 which are in the form of flexible containers, such as plastic bags. In the embodiment shown, each of the flexible containers is connected by suitable connecting means to a branch pipe 11 and further is appropriately mounted with one corner, for example, fixedly attached, as at 14, to an appropriate fixed point in the region adjacent the elements 15 which are to be heated so that each of the containers are maintained in an extended position relative to branch pipe 11.

The heated fluid, such as the vapor obtained from boiler 6, is supplied to each independently operable heat exchange device 13 and condenses within such heat exchange device, the heat which is given up thereby being dissipated therefrom by convection to the atmosphere surrounding the flexible plastic container. Air which flows over the heat exchange device 13 is thereby heated, the heated air then flowing to the element 15 to heat the latter element as desired.

Figure 2:
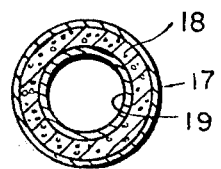
FIG. 2 shows a view in cross section of the pipe components utilized in the system of FIG. 1.

FIG. 2 shows in more detail a preferred embodiment of the pipes 7 and 11 of FIG. 1 wherein the pipe comprises a fluid and wear resistant outer surface 17, a core of flexible insulation material 18 and a vapor impermeable inner surface 19. The outer surface material may be nylon, for example, the core material may be a flexible polyurethane foam material, and the inner surface may be polyurethane, for example.

Figure 2A:
FIGS. 2A and 2B show variations of the pipe components of FIG. 2 in non-operating condition.
Figure 2B:
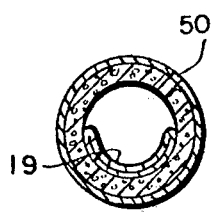

As can be seen in FIG. 2A the structure of FIG. 2 as made from the materials specified above, or their equivalents, can be laid flat under equal internal and external pressure conditions so as to minimize the non-condensible gas in the system when the system is not operating. Alternatively, as shown in FIG. 2B, it may be only the fluid conducting inner portion 19 which collapses, a plurality of openings 50 along the structure allowing the ambient pressure to reach inner tube 19.

Figure 3:
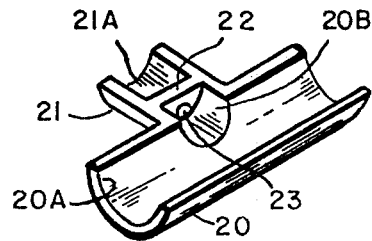
FIG. 3 shows a cut-away pictorial view of a branch fitting of the piping components in the system of FIG. 1.

FIG. 3 shows the construction of a branch fitting 8 wherein there is a main conduit portion 20 having a main through passage 20A having an opening 20B therein for coupling the main passage to a branch conduit portion 21 having a branch passage 21A. A constriction element 22 may be positioned in branch path 21A and may be arranged to have either a fixed or variable opening 23 therein which can be utilized to balance the vapor in the various heat exchange devices with their required loads. The opening 23 may be located so as to facilitate flow of liquid condensate back into passage 20A where required.

Figure 4:
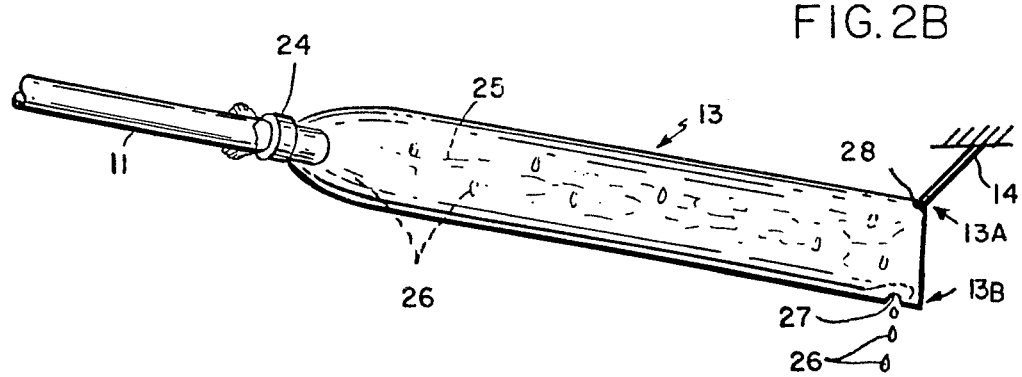
FIG. 4 shows a pictorial view of the flexible heat exchange devices used in the system of FIG. 1.

FIG. 4 shows in more detail the flexible container which operates as the heat exchange device 13 of the system when it is coupled to a branch pipe 11 at the end remote from branch fitting 8. As seen therein, such device comprises a membrane envelope such as a plastic bag which is appropriately sealed over the opening of branch pipe 11 with a clamp 24. Vapor 25 which is introduced into the envelope condenses therein and thereby gives up heat which is conducted through the membrane into the surrounding environment by convection.

In the embodiment depicted in FIG. 4, the flexible container is fixedly mounted adjacent an element to be heated in such a manner that a corner 13A thereof is fixedly mounted at 14 so that the end of the container which is remote from branch pipe 11 is at a lower level than the latter. Accordingly, as the vapor condenses, the fluid condensate 26 is collected in the lower part of container 13 by flowing down the sides of the envelope to the lowest point in the vicinity of the corner 13B thereof. An appropriate opening 27 may be placed in the envelope to permit the condensate to flow out as shown. An additional hole 28 may also be placed at the upper portion 13A of the envelope, if desired, in order to allow all air or other non-condensible gasses to escape from the container so that the vapor which is supplied through branch pipe 11 is permitted essentially to completely fill the entire envelope.

When the heating system of FIG. 1 is used with heat exchange devices mounted as shown in FIG. 4, all the pipes and passageways through which the vapor passes are arranged to slope downwardly from boiler 6 as the vapor flows therefrom toward the exit holes 27. Such an arrangement prevents the liquid condensate from flowing back in a direction toward the boiler which back flow might tend to hinder the flow of vapor within the various passageways. In such a system, fluid from tank 5 is continually added to make up for that which is lost through the flowing of condensate out the holes 27 of flexible containers 13. Such an embodiment may be advantageous in that the non-condensible gasses can be automatically exhausted from the flexible containers and there is less concern that leaks in the system will reduce its effectiveness. Hole 27 can be at any location in the envelope so long as it is essentially at the lowest point.

Figure 5:
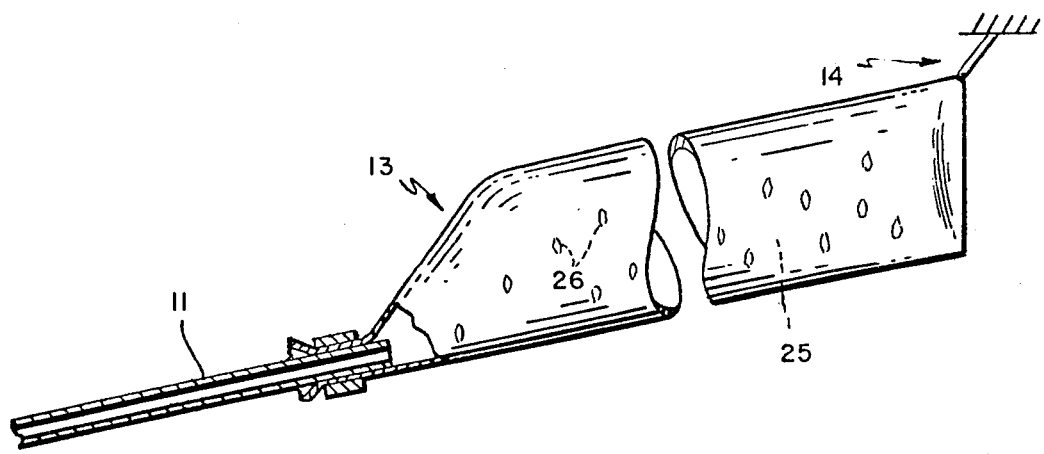
FIG. 5 shows a view partially in section of another embodiment of the heat exchange device of FIG. 4.

FIG. 5 shows another embodiment of the invention utilizing the components depicted in FIG. 4 wherein the flexible envelope is sealed at one end and one corner thereof is tied at an elevation at which the sealed end is at a higher level than the input end which is clamped at pipe 11. In this particular embodiment since the envelope is in a sealed form, the holes 27 and 28 present in the embodiment of FIG. 4 are not used. In accordance therewith the liquid condensate 26 flows from the sealed end toward and into the branch pipe 11 and back to the boiler. Accordingly, such an embodiment as utilized in an overall system of FIG. 1 requires that the heat exchange devices 13 and all means for conveying the liquid condensate slope downwardly toward the boiler source of vapor so that the condensate is returned for reheating. While condensate is present in pipes 7 and 11 and branch fittings 8 during operation thereof it need not be present in some applications in sufficient quantities to block passage of the vapor. Such a configuration requires no continual addition of make-up liquid from tank 5 but the overall system must be kept substantially sealed so as to be free from leaks and other sources of non-condensible gasses which may exclude the vapor from entering the desired heat exchange regions of the overall system.

Figure 6:
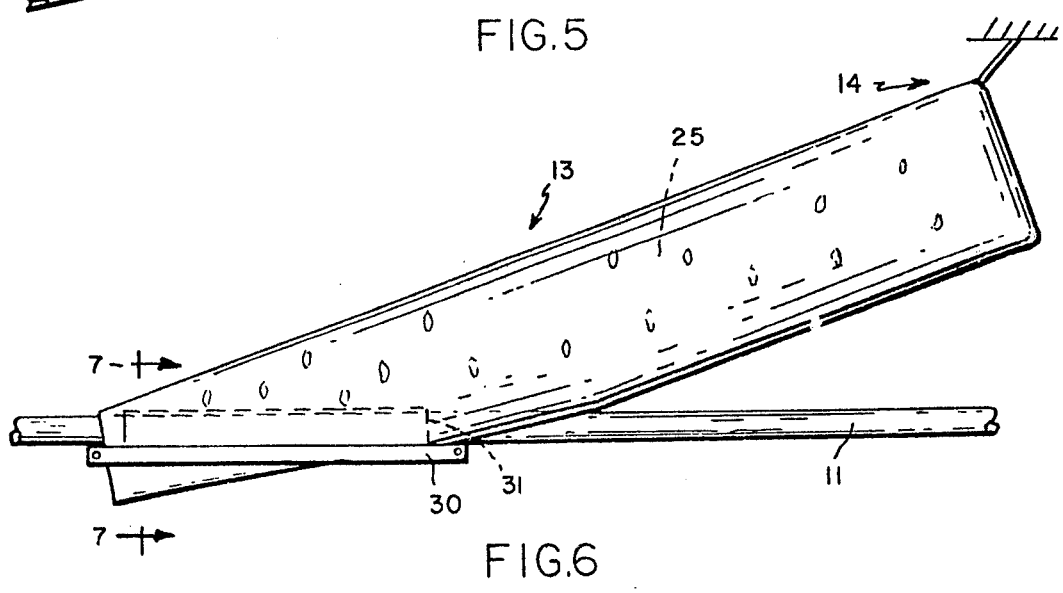
FIG. 6 shows a side view of still another embodiment of a heat exchange device which can be utilized in the system of FIG. 1.
Figure 7:
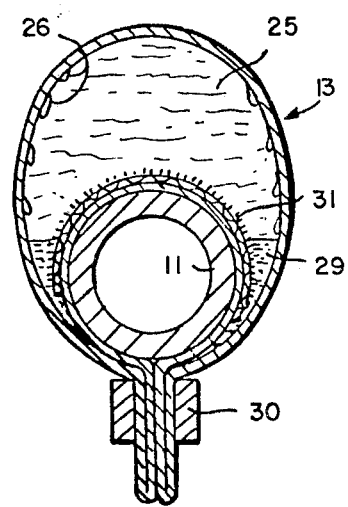
FIG. 7 shows a view in cross section taken along the line 7—7 of the heat exchange device in FIG. 6.
Figure 8:
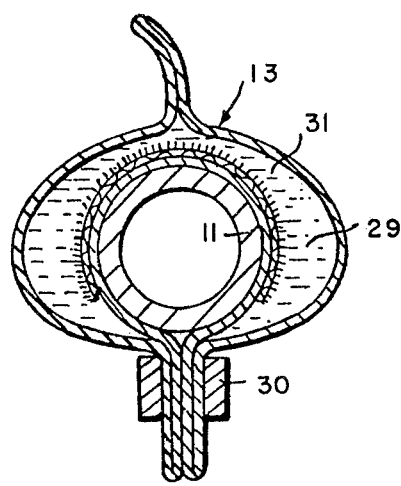
FIG. 8 shows a view in cross section of the heat exchange device of FIG. 7 under different operating conditions of the system.

FIGS. 6, 7 and 8 show another embodiment of a heat exchange device 13 which can be utilized in the system of the invention wherein the heat exchanger device 13 is a self-contained and completely sealed unit, the interior of which is not directly coupled in any way to the interior of pipe 11 or to the heated vapors or liquid which is passing therethrough. The flexible envelope can be first evacuated, charged with an appropriate amount of working fluid 29 and then sealed. A portion of the envelope is then wrapped in thermal relationship about the exterior of a portion of the pipe 11, which is preferably not insulated in this area, which pipe carries heated vapors or a heated liquid, and appropriately secured such as with a suitable clamp 30, or by the use of a suitable adhesive for bonding the envelope to the exterior surface of the pipe. The envelope is supported at one corner, as at 14, to a convenient fixedly mounted structure so that the envelope extends at an angle away from pipe 11. As shown in FIG. 7 a portion of the interior surface of the envelope can be covered with a porous wicking material 31. When the system is not in operation the heat exchange device is in an essentially collapsed state as shown in FIG. 8 wherein the temperature of pipe 11 is below the boiling point of the working fluid 29 contained therein. Accordingly, the fluid 29 is in a liquid state and the envelope is collapsed substantially tightly except for the region which contains the working fluid 29. The collapsed exterior surface of the heat exchange device 13 thereby provides no effective heat exchange function with respect to pipe 11 or the surrounding atmosphere. During operation the pipe member 11 is heated in any appropriate way such as by passing a heated fluid, either in a liquid or vapor state, therethrough or by any other appropriate means, the heat thereof being conducted from pipe 11 through the portion of envelope 13 which enclosed pipe 11 to the working fluid 29. When the temperature of the working fluid is thereby raised to a point where it exceeds its boiling point at whatever pressure exists through the envelope 13, the working fluid boils and produces a vapor 25 which causes an expansion of the volume inside the envelope 13. The vapor, accordingly, condenses on and gives up its heat through the envelope and primarily by convection therefrom to the external atmosphere, the condensate 26 thereby forming on the interior wall of the envelope as shown. When the heating rate is at a maximum the envelope is substantially filled with vapor and the fluid level of the working fluid 29 drops to a minimum. If the wicking material is not used, enough working fluid for efficient operation is required so that the fluid level during operation remains substantially at or above the pipe 11. It has been found that under such circumstances the boiling process tends to produce audible noise at levels which may not be tolerable in some applications. However, the addition of the wick 31 as shown in FIGS. 7 and 8 permits the use of less working fluid 29, the wick thereby drawing the fluid upward by capillary action so as to wet the entire heated surface of the envelope which encircles pipe 11. It is found that when such wicking material (and, consequently, less working liquid) is utilized, the noise level is much less audible. Further, the temperature drop through a thin wetted wick can be less than that through a large bulk of boiling liquid, which factor may be of interest in some more critical applications. In either case the supporting structure 14 maintains the envelope at a level higher than the pipe 11 so that the fluid reservoir is always in communication with the heated portion of the envelope at pipe 11, the condensate thereby running downwardly toward the clamped portion thereat. When the heating rate is less than at its maximum value, the vapor only partially fills the envelope and, thus, the heated area is a fraction of the total area of the envelope.

An advantage of the embodiment shown in FIGS. 6-8 is that the heat exchange device can be installed or removed from the system without interruption to the operation of the overall system during such activity. The overall heat which is dissipated can be varied simply by adding or removing heat exchange devices 13. Moreover, in such an embodiment the failure of one or a few of the heat exchange devices, e.g., the rupture thereof, does not interfere with the integrity of pipe member 11 or with the operation of any of the other heat exchange units other than to reduce the contribution to the overall heat transfer by the loss of whatever is contributed by the particular unit which has failed. The working fluid 29 can be selected so that its boiling point is useful for particular applications. For example, it may be desirable that the heat exchanger not operate until a particular temperature level is reached at pipe member 11 (e.g., at the pipe's dangerous overheat temperature point). Accordingly, a working liquid having a boiling point at the expected ambient pressure substantially at such overheat temperature is selected so as to cause the heat exchange device to begin its operation at that point so as to maintain the temperature of pipe 11 at or below such predetermined temperature point.

The device can be made to function at a temperature significantly below that of the heat source 11 with a suitable fluid, if the area in heat exchange relationship with said heat source 11 is small enough with respect to the effective heat exchange area of the envelope relative to the surrounding region to limit the heat input to a value which can be dissipated by the device without producing excessive pressure at the temperature of the vapor in the device.

Figure 6A:
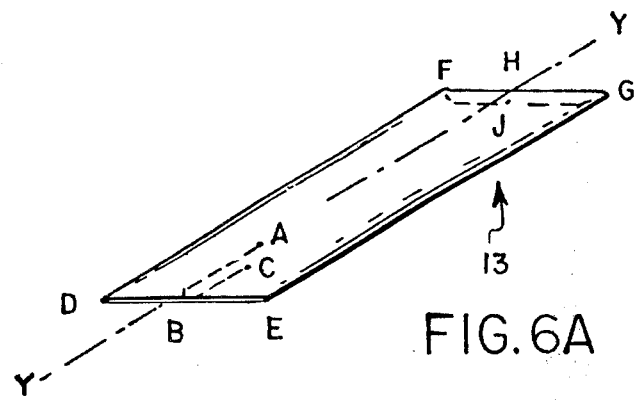
FIGS. 6A, 6B and 6C show the steps in the formation of the heat exchange device as used in the system of FIG. 6.
Figure 6B:
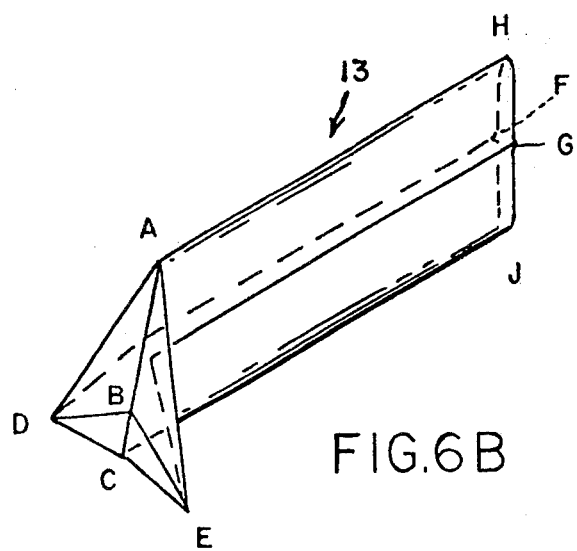
Figure 6C:
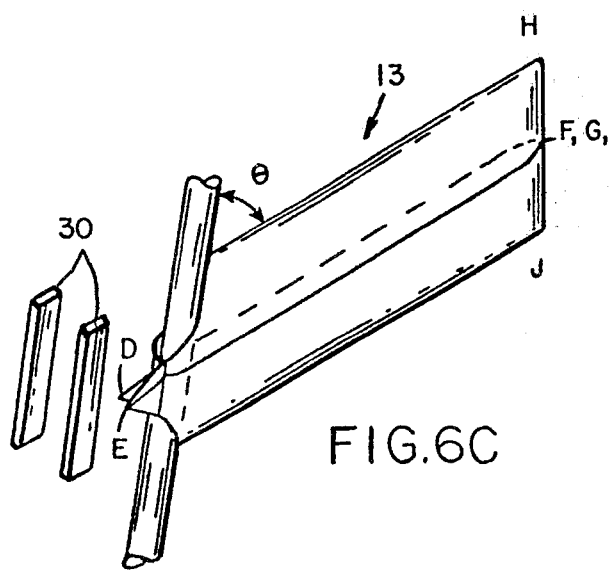

In utilizing the configuration of FIG. 6, the heat exchange envelope can be most efficiently formed in order to be conveniently wrapped around the branch pipe 11, as shown in a preferred formation thereof depicted in FIGS. 6A, 6B, and 6C. As shown therein the formation thereof begins with a simple collapsed tubular plastic envelope structure 13 which lays flat, as shown in FIG. 6A. In the flat state the envelope structure has the reference points A, B and C, and corner points D, E, F and G, and midpoints H and J, shown therein, which points are useful in describing the folding process. First of all, points A, B, and C are selected so that A and B form a line AB corresponding to the longitudinal axis Y—Y of the envelope on its upper layer, and B and C form a line BC parallel thereto on its lower layer. The selection of A, B and C is such that the distance $AB + BC = DE/SIN\ \theta$, B being the midpoint of DE, and $\theta$ being the angle formed between the envelope 13 and pipe 11 where the former is wrapped around the latter as shown in FIG. 6C. The ratio of the lengths AB and BC thereby essentially determine such angle $\theta$. If a wick is included in the interior surface of the envelope it is secured thereto and centered along the line formed by ABC (in FIG. 6B) in one or more pieces, leaving material for the seam. The tube is sealed by forming a leak tight seam along DBE.

The exchanger device is formed by pulling points A and C in opposite directions so that the points A, B and C lie in a substantially straight line and by flattening out the triangles ACE and ACD. The entire folded enchanger device can then be further flattened to remove ambient gas and charged with working fluid as required and appropriately sealed in a leak-tight seam, such as along the line HJ, for example. To install the exchanger the triangular portions, ACE and ACD, are placed on a heat source as by wrapping around a pipe 11, for example, with the line ABC being aligned with the axis of the pipe. The exchanger can then be bonded to the heat source with an application of a suitable adhesive, or double sided tape or, in the case of a pipe, it can, when wrapped around the cylindrical surface of the pipe, be secured with a clamp as shown in FIGS. 6 and 6C.

In FIGS. 4, 5 and 6 the flexible envelope can be of a suitable material, preferably a plastic film material such as polyester, nylon, polyimide or paper or cloth or even of very thin sheet metal or rubber material. Further, the material may be a plastic film which has been metallized with a very thin coating of a metal to reduce the problem of gas permeability.

Figure 9:
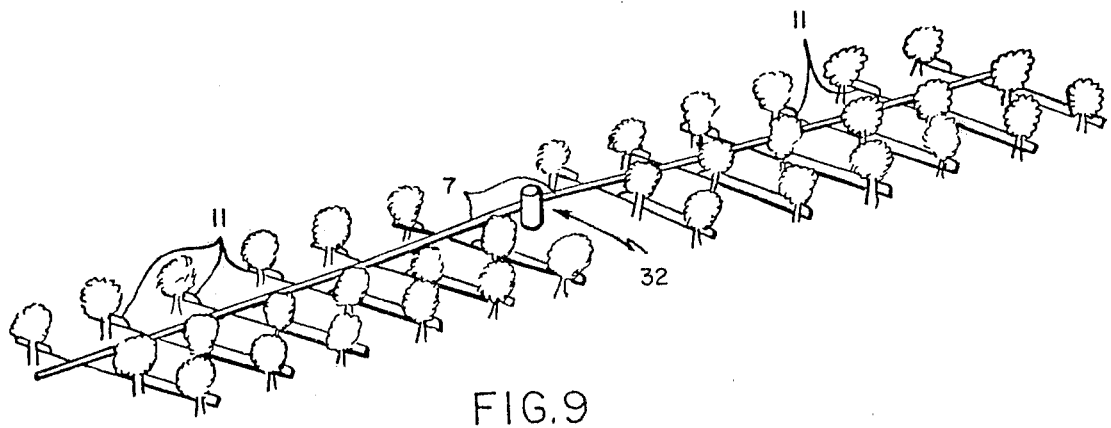
FIG. 9 shows the system of the invention as applied to the heating of agricultural plants in an orchard.

FIG. 9 shows in simple diagrammatic form one particular application for the system of the invention wherein it is utilized for heating agricultural units, such as trees or other plants which may be, for example, planted in an orchard array and during certain seasons be subjected for short intervals of time to an undesirable low temperature environment. The trees are separately positioned at various independent locations throughout the orchard, usually in a uniform manner as shown, and the heat generating source 32 of the system is placed at a convenient location with respect thereto, the location being shown in the embodiment of FIG. 9, as substantially central to the overall array. Appropriate pipe members 7 carry heated vapors, as described above, to each of the independently operating heat exchange devices which are tied thereto through branch lines 11. While any one of the embodiments shown in FIGS. 4, 5 and 6 may be utilized for the combination of branch lines and heat exchange devices, as the array of elements which are to be heated becomes relatively large in size and number and the temporary nature of the installation becomes more evident, the particular embodiment shown in FIG. 4 may be more desirable in some applications since it is less subject to difficulties due to leaks and due to the presence of non-condensible gasses in the system. In such installations water is a reasonable fluid, so that the need for make-up fluid is not a disadvantage and the deposit of fluid from the system at the trees should not prove harmful. Clearly, however, the other embodiments shown in FIGS. 5 and 6 and/or other fluids may also be used in such an application.

Figure 10:
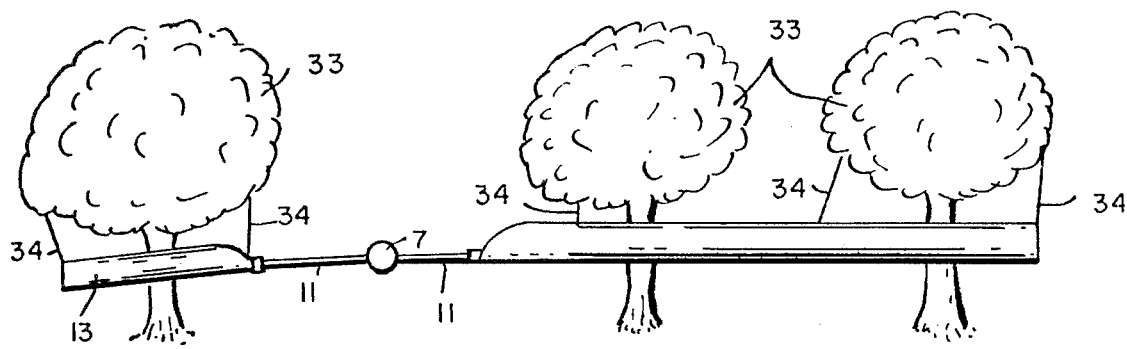
FIG. 10 shows a more detailed view of a portion of the system shown in FIG. 9.

FIG. 10 shows in somewhat more detail how the heat exchange devices could be applied to the individual trees 33. For example, a heat exchange envelope 13 may be suspended from appropriate branches of a single tree by suitable wires, or cords 34 or the like, so as to be suspended under the branches and substantially adjacent the trunk of the tree. Alternatively, a larger heat exchange envelope may be used and suspended from the branches of more than one tree to extend thereunder as shown. The column of heated air in the vicinity of the heat exchange devices moves upwardly through the branches are provided for efficient heating thereof.

Figure 11:
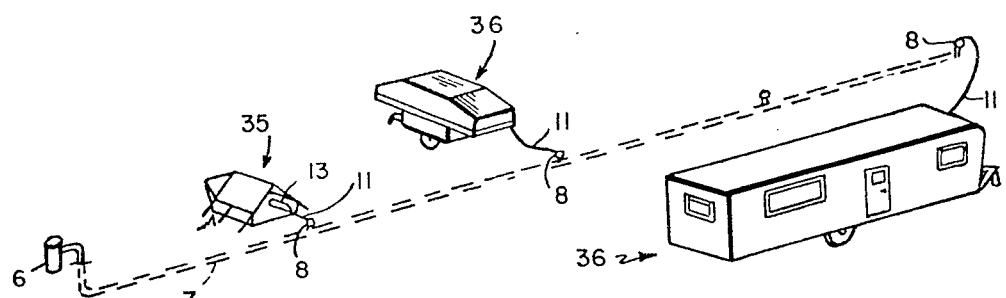
FIG. 11 shows still another application of the invention as used for the heating of campsites.
Figure 12:
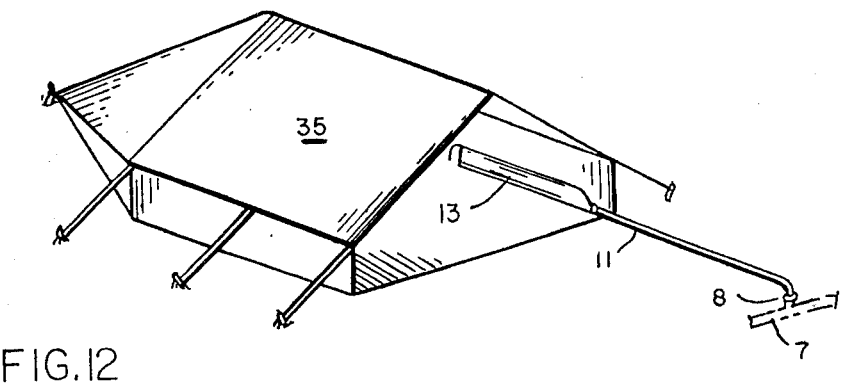
FIG. 12 shows an enlarged view of the installation of the heat exchange devices in the system of FIG. 11.

FIG. 11 shows the system of the invention as applied to a group of campsites, or other temporary housing units. Vapor from boiler 6 flows through piping system 7 which can be temporarily or permanently placed above the ground or permanently installed below the ground. The vapor flows to branch fittings 8 which can be located at the prepared sites. When a unit is to be occupied, a rigid or flexible pipe 11 can be plugged into the branch fitting and a valve opened to allow heated vapor into a heat exchanger device 13 which can be deployed in a tent 35 or in various trailer units 36, or other housing units as desired. A detailed description of a heat exchanger 13 as tied to an appropriate point within a tent 35 is shown in FIG. 12. In the campsite application it is clear that any one of the heat exchange device configurations of FIGS. 4, 5 and 6 can be used. In a preferred embodiment it might be more desirable to utilize a high temperature vapor such as steam, to more efficiently transfer the heat over greater distances via the piping system, while using separably mounted heat exchanger devices as in FIG. 6 which contain a working fluid therein of a lower boiling point (e.g., Freon 113) so that the heat exchange operation at the individual campsites will operate at the lower boiling point of the working fluid (e.g., at approximately 117° F.) which structure would reduce the possibility of danger to the occupants of the campsite as from accidental contact with the higher temperature. Alternatively, a higher temperature vapor, such as steam, could be used in a heat exchange envelope which has sufficient thermal insulation properties so that the exterior surface thereof is maintained at a lower temperature than the interior surface thereof, or other suitable safeguards may also be used.

Figure 13:
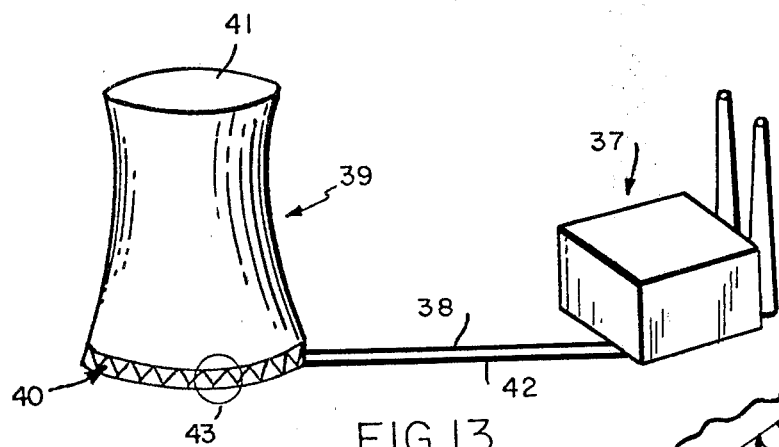
FIG. 13 shows a diagrammatic view of the application of the system of the invention to a cooling tower.

FIG. 13 shows the system of FIG. 1 as applied to a dry cooling tower such as utilized for dissipating heat generated from an electric power plant. As shown therein the power plant 37 rejects heat in a heated fluid flowing through a pipe 38 which extends into a cooling tower 39 to an array 43 of heat exchange devices therein (a portion of which is seen in more detail in FIG. 14) where it transfers its heat to the air which is drawn in through the open supporting structure 40 at the base of the tower, over such array, and eventually upwardly through the tower where the heated air is exhausted to the atmosphere via opening 41 at the top thereof. The cooled fluid then returns to the power plant through pipe 42. Though it is possible to use any of the configurations of heat exchange devices shown in FIGS. 4, 5 and 6, in this application it may be more suitable to utilize those of FIG. 6 inasmuch as the heated fluid from the generating plant is most likely to be water at a temperature of about 120° F., considerably below the boiling point thereof, so that a working fluid within the heat exchange devices which boils at a temperature below such water temperature (e.g., Freon 113 which boils at 117° F.) can be used.

Figure 14:
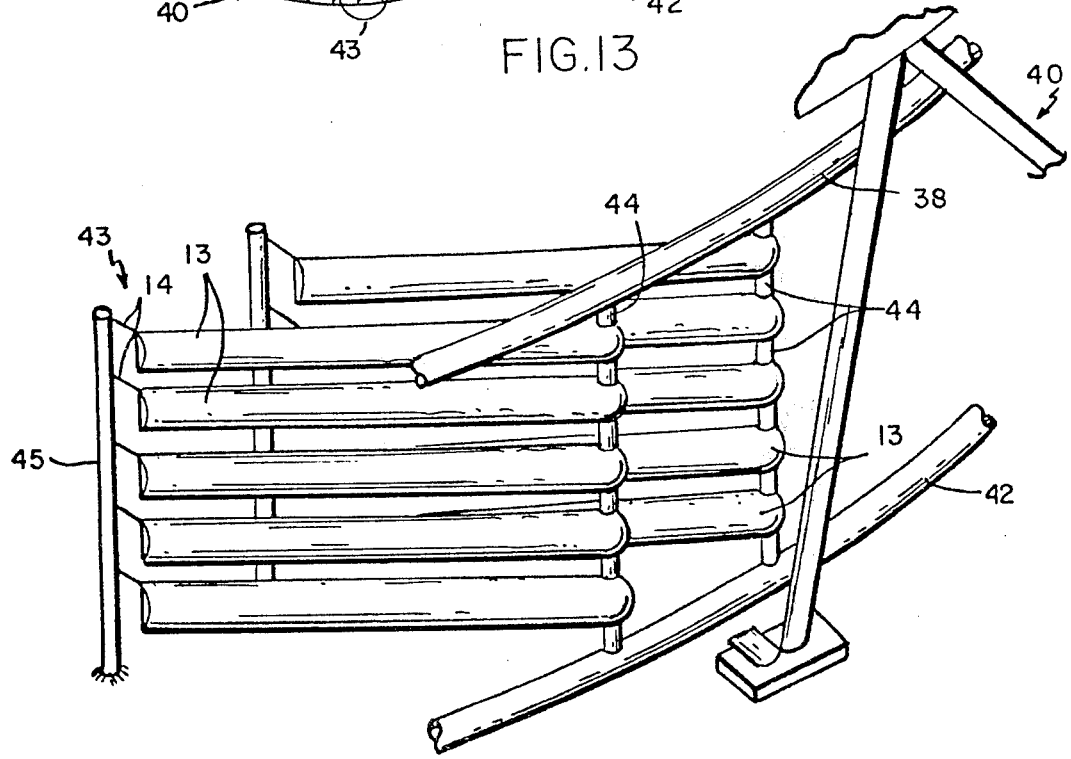
FIG. 14 shows a view in more detail of the heat exchange devices as used in the cooling tower system of FIG. 13.

FIG. 14 shows one manner in which the heat exchange devices can be placed in an array 43, a portion thereof being shown therein. Other physical configurations for a heater exchange array which may be well suited to various applications may be devised by those in the art. In the particular configuration shown therein a heated fluid from the power plant generating source flows into the heat exchanger network through pipe 38 from which small amounts are extracted through branch pipes 44. A plurality of heat exchange devices 13 are secured to the branches in a manner such as shown in FIG. 6, for example, and are supported at one corner, as required, at points 14 on supporting posts 45. Cooled fluid is then returned to the system through pipe 42.

As can be seen, the total number of heat exchange devices and the array in which they are arranged can be selected for that particular heat dissipation requirements involved. Several hundreds or several thousands of such devices may be utilized at the base of a cooling tower which may be several hundred feet or several hundred yards in diameter and in height. Because of the simplicity of the piping and the low cost of the heat exchange devices, which are in the form of the flexible envelope containers discussed above, the cost per unit area of heat exchange can be much lower than that of presently known systems which utilize an elaborate array of metal pipes having metal cooling fins. Moreover, in the system of the invention the heat exchange operation does not occur when the working fluid temperature falls below its boiling point so that the system is automatically protected from damage due to freezing, as when the heated input flow stops for one reason or another in cold weather. The latter situation has been a problem in the use of current dry cooling tower designs.

While in the particular embodiments discussed above the heat exchange which occurs is primarily by convection, the heat exchange devices may also be arranged to provide for heat exchange by other processes such as by radiation or conduction, or by appropriate combinations thereof. Further, those in the art may devise other embodiments and applications for the system of the invention as described above, which embodiments are well within the scope of the invention. Accordingly, it is desired that the invention not be limited by the details of the embodiments described above except as defined by the appended claims.

The following U.S. Pat. Nos. were obtained by a patent search:
 1,777,982
 3,402,763
 3,444,922
 3,461,952
 3,496,995

What is claimed is:

1. A fluid conveying means in the form of a pipe comprising
   a tubular core of thermal insulation material;
   an outer layer on said core of a fluid and wear resistant material;
   an inner layer within said core of a vapor impermeable material, only the inner layer of said conveying means being capable of substantially completely collapsing under conditions wherein a minimum pressure difference exists between the pressure external to said pipe and the pressure within said inner layer.

2. A fluid conveying means in accordance with claim 1 wherein at least one of said tubular core and said outer layer provides support for said layer of vapor impermeable material.

3. A fluid conveying means in accordance with claim 1 wherein at least one of said outer layers provides additional protection for said layer of vapor impermeable material against external forces which would prevent operation of said fluid conveying means.

4. A fluid conveying means in accordance with claim 1 wherein said tubular core and said outer layer have one or more openings for permitting the pressure external to said pipe to reach said layer of vapor impermeable material.

* * * * *